J. H. GRAY.
SMELTING TIN AND OTHER ORES.
APPLICATION FILED MAR. 18, 1919.
1,340,951.
Patented May 25, 1920.
4 SHEETS—SHEET 1.
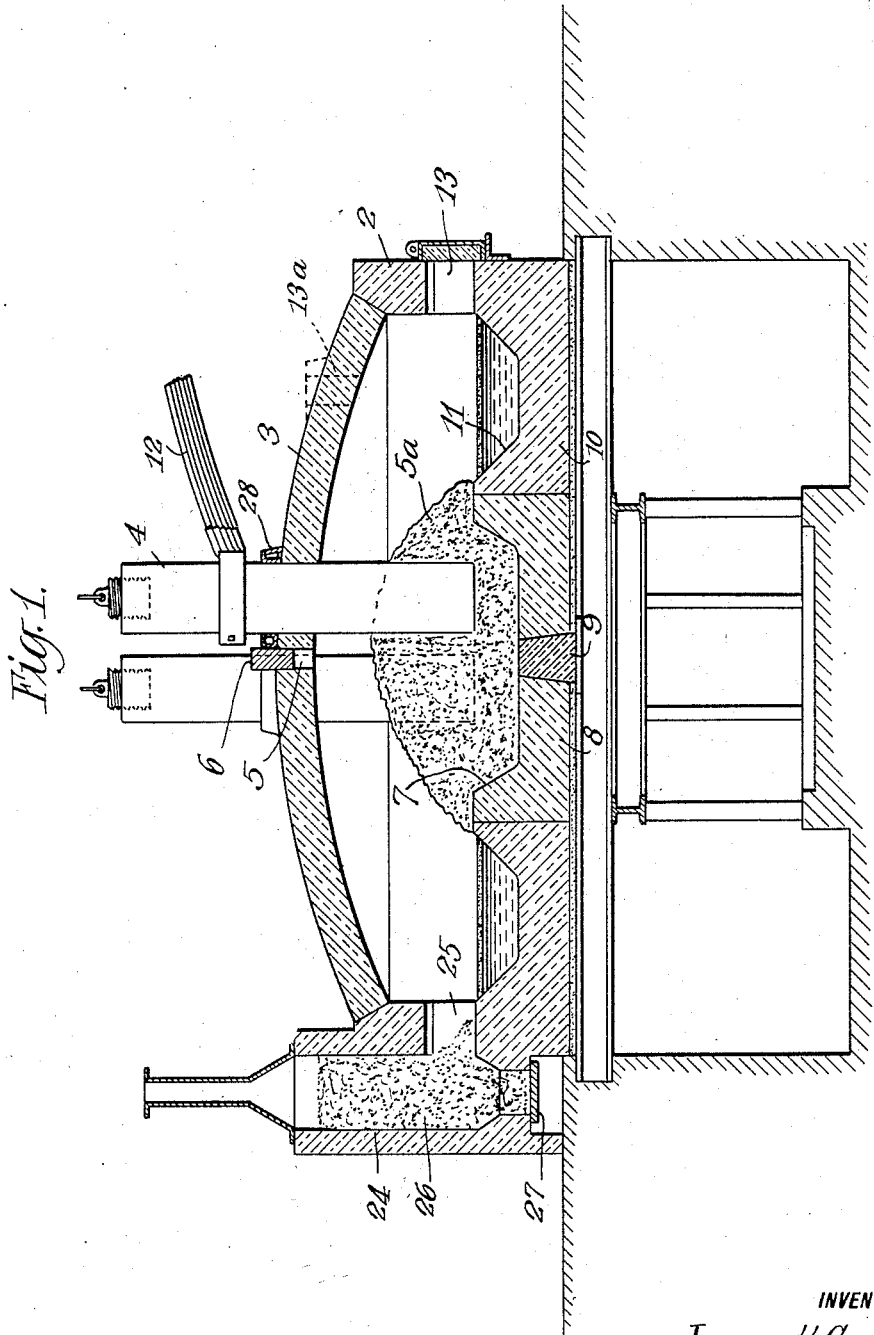
INVENTOR
James H. Gray
BY
ATTORNEY

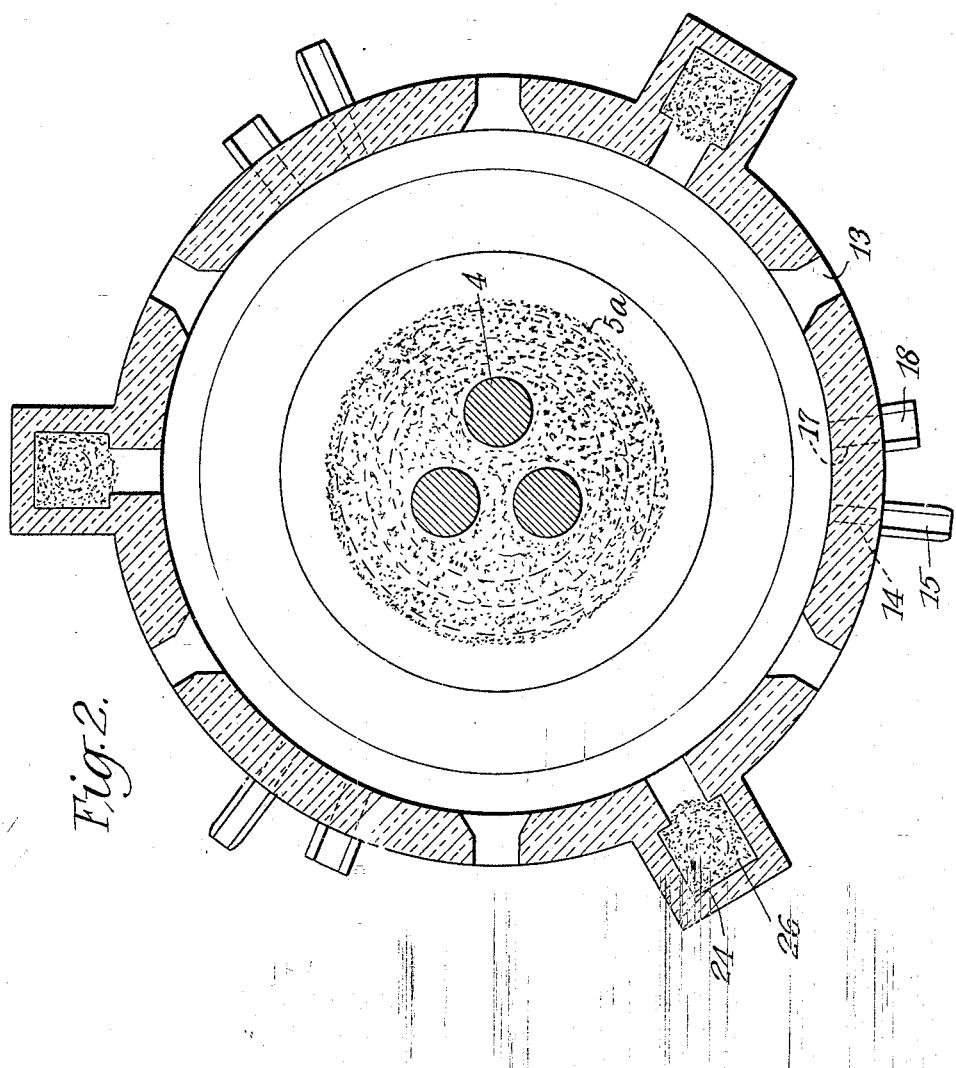

J. H. GRAY.
SMELTING TIN AND OTHER ORES.
APPLICATION FILED MAR. 18, 1919.
1,340,951.
Patented May 25, 1920.
4 SHEETS—SHEET 3.
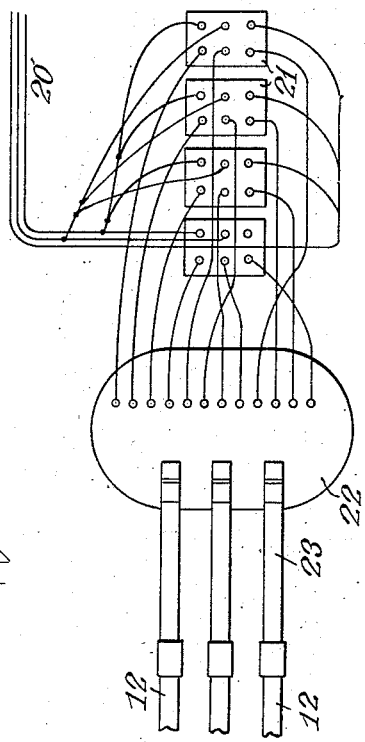
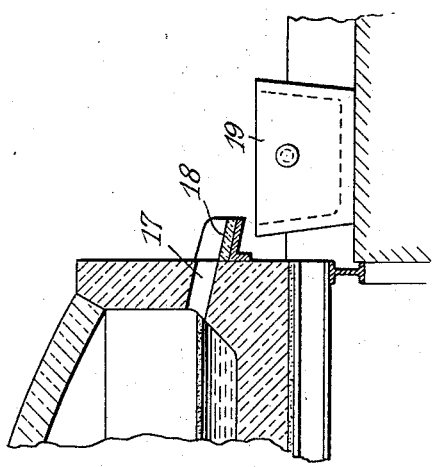
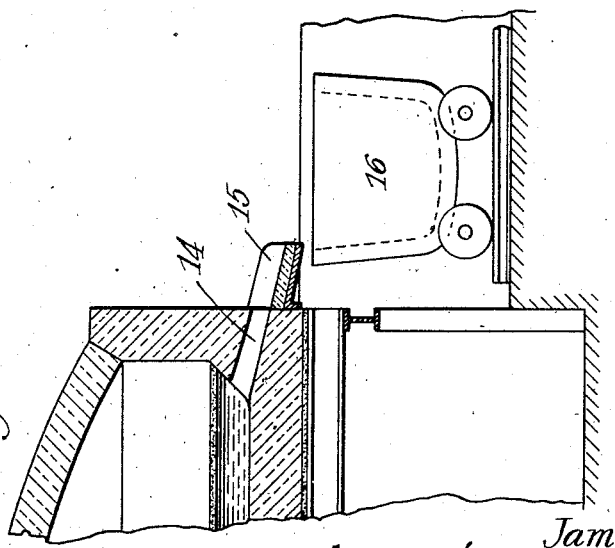
INVENTOR
James H. Gray
BY
*Anthony Usina* ATTORNEY

J. H. GRAY.
SMELTING TIN AND OTHER ORES.
APPLICATION FILED MAR. 18, 1919.

1,340,951.

Patented May 25, 1920.
4 SHEETS—SHEET 4.

INVENTOR
James H. Gray
BY
ATTORNEY

UNITED STATES PATENT OFFICE.

JAMES H. GRAY, OF NEW YORK, N. Y.

SMELTING TIN AND OTHER ORES.

1,340,951.	Specification of Letters Patent.	Patented May 25, 1920.

Application filed March 18, 1919. Serial No. 283,303.

*To all whom it may concern:*

Be it known that I, JAMES H. GRAY, a citizen of the United States, residing in the city, county, and State of New York, have invented certain new and useful Improvements in Smelting Tin and other Ores, of which the following is a specification.

In the smelting of tin the ore is usually placed with the necessary fluxes on the hearth of a long reverberatory furnace which is heated by means of a flame passing from one end to the other. The flame is oxidizing and is therefore not most effective in eliminating oxygen from the ore, which is usually an oxid. Also a certain amount of tin is volatilized and carried by the draft into the discharge flues or into the atmosphere. A part of this is lost and part of it is recovered, though with difficulty and at considerable expense. Similar difficulties are met in the smelting of ores of other metals which are easily volatilized, such for example as zinc. Other styles of furnace have been proposed but have not superseded that above described.

I propose to heat the ore electrically by a very efficient resistor and to maintain the atmosphere and all the conditions neutral or at least non-oxidizing within the furnace; which is specially adapted for the purpose of smelting such ores and which may also be used for a number of other purposes. Other features of advantage have also been incorporated, as stated in detail hereinafter.

The accompanying drawings illustrate such furnaces and their method of use.

Figure 1 is a central vertical section;

Fig. 2 is a horizontal section through the charging doors;

Figs. 3 and 4 are partial vertical sections through the metal tapping and slag tapping openings respectively;

Fig. 5 is a diagrammatic plan of the electrical connections;

Figure 7:
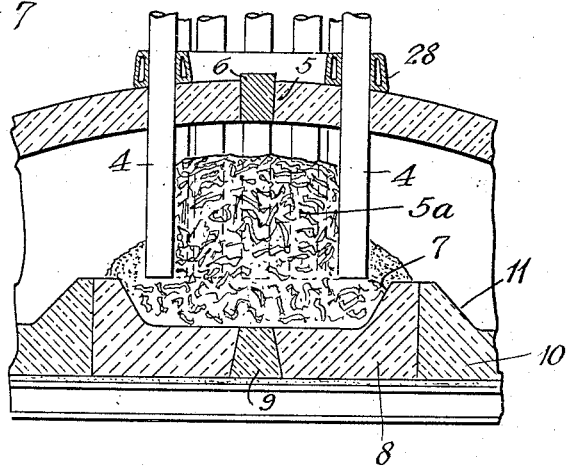
Figs. 6 and 7 are a diagrammatic plan and section respectively, illustrating a modification.

Referring to the example of the furnace illustrated in Fig. 1, the wall 2 is circular in plan surmounted by a domed roof 3 through which pass the electrodes 4, preferably three in number or a multiple of three in order that a three-phase electrical current may be used. The electrodes form a sort of cage in the center of which an opening 5 is provided through the roof through which coke or equivalent conductive material $5^a$ may be introduced and which during operation is practically closed by a stopper 6. The coke falls into a well 7 located at the center of the hearth of the furnace and forms a mound between and around the lower ends of the electrodes, being preferably introduced in sufficient quantity to fill the well and to cover the side walls thereof. This well is formed in a central member 8 which has an opening at the bottom closed by a plug 9 which can be withdrawn in order to permit removal of the ash which gradually accumulates as the coke is consumed.

Around the central member 8 is an annular hearth 10 shaped to form an annular trough 11 in which the ore is placed and reduced. Current is conveyed to the separate electrodes by cables 12 and they are supported from overhead in any usual or suitable way and gradually lowered as they are consumed. When the current is applied the coke becomes incandescent, small arcs being formed between the pieces of the coke in the path of the current as it passes from one electrode to another. The temperature which can be obtained in this way is very great. The temperature of the electric arc is one of the highest known, namely 3600 degrees centigrade, and the coke can be made to approach this temperature if desired by the use of very heavy electric currents. The heat from the central portion of the furnace radiates out over the charge and causes the desired reaction between the oxygen of the ore and the carbon which is mixed therewith in the charge and thus liberates the tin. The gases formed in the furnace are mainly carbon monoxid, which is reducing or at least non-oxidizing. The formation of gases within the furnace causes a pressure therein which ordinarily prevents air from entering. But when the doors of the furnace are opened for charging or for manipulating the charge on the hearth a certain quantity of air enters and unites with the incandescent coke in the center, which is thus gradually consumed. Additional coke is introduced from time to time as needed through the opening 5 in the roof of the furnace.

The charge in the annular hearth 11 will be of the ordinary character. For example it may consist of ten tons of tin ore analyzing approximately 70% of tin and containing 89% of tin oxid and 11% of impurities (largely silica and partly lime and alumina); to which are added one and a half tons of anthracite coal and sufficient lime or similar material to balance the impurities in the ore and form a suitable slag. Such a charge is mixed together and introduced in such quantity that after melting it will approximately fill the annular trough.

Doors 13 are arranged at intervals around the furnace which may be used for charging the furnace or for rabbling or manipulating the charge. Or charging openings 13ª (Fig. 1) may be made in the roof and will facilitate mechanical charging, and should be provided with close fitting plugs or covers. For drawing off the molten tin there are tapping holes 14 (Fig. 3) registering with the bottom of the annular trough 11 and provided with spouts 15 for conveying the tin into a vessel 16. For removing the slag from time to time there are openings 17 (Fig. 4) registering with the slag level and spouts 18 for running the slag off into suitable vessels 19.

During the smelting operation a certain amount of the coke in the central well may flow over the wall thereof, but no harm will be done because it will enter the slag on the charge and merely increase the reducing agent therein. It is advisable to keep the wall of the center well covered with coke so as to protect it from the heat. Likewise no harm will be done if, during the boiling of the charge, some of the slag therefrom should overflow the wall and mingle with the central mass of coke. The slag at high temperatures is electrically conductive and will serve like the coke as a heating medium.

I prefer a mound of coke as described, but the conductive material in the well may consist of other substances and the surface of the mass may be horizontal instead of convex as shown. In the case of such a horizontal mass the electrodes will not be buried therein but visible arcs will be struck between the electrodes and the heating medium. This arrangement works well in supplying heat for smelting, but the exposed arcs are more destructive to the refractory material used in the construction of the furnace. It would be possible, for instance, to have the central well filled with pig iron which will be molten during the operation of the furnace, or the pig iron might be covered with a slag which would be conductive at high temperatures.

The sides of the central well should be made of a good refractory material such as magnesia brick and I have assumed that the central member 8 is all made of such brick, or the bottom and sides of the central well may be made of carbon. The member 10, however, in which the annular trough 11 is formed may be of less refractory material such as fire brick or bauxite.

When the current is first passed through the electrodes in a cold furnace containing cold coke the electrical conductivity of the latter is comparatively poor, but it increases as the temperature of the coke increases. I prefer, therefore, to change the voltage as the temperature rises and I have shown diagrammatically in Fig. 5 a common style of volt changer.

The wires constituting the line 20 pass through oil switches 21 to successive points in the primary coils of a transformer 22 of which the secondaries are connected by bus bars 23 to the cables 12 which lead to the several electrodes. As the current is passed through one or another of the switches 21 the number of turns of the primary coils of the transformer which remain in the circuit is increased or decreased and the voltage similarly changed.

When the current is first applied the voltage may be between one and two hundred for the design of furnace shown, say approximately one hundred and fifty volts. The current flowing is indicated by ammeters and gradually increases in quantity as the resistor is heated. The voltage is, therefore, gradually cut down by means of the volt changer described to say between thirty and forty volts. By this means the temperature of the furnace can be controlled.

Before introducing the charge I prefer to heat the resistor and to cut the voltage down to a point where a moderate temperature is secured, bringing the temperature in the whole furnace to something less than that which is required during the smelting operation. I then introduce the charge, say of tin ore, carbon and fluxing materials above described, and after it has become heated and has been worked in the usual way I increase the current and raise the temperature. Supposing that in the design illustrated the electrodes are twenty-four inches in diameter, I propose to use 2000 K V A in the furnace and this will give a temperature of approximately 1600 degrees centigrade. At the usual or appropriate times slag is withdrawn. After about seven hours the whole charge is reduced and the tin is in a molten form on the bottom of the annular trough, and is withdrawn through the tap holes provided for the purpose. The bottom of the furnace is then repaired if necessary and a new charge is immediately introduced and treated as before.

In order to allow gases to escape from the furnace freely but without admission of air and at the same time to trap any tin which may be in the gases in the form of oxid, I provide flues 24 communicating with the furnace through openings 25 above the level of the charge and containing a body 26 of coke or other carbonaceous material which will catch and retain the oxids. The bottoms of these flues 24 are closed by removable covers 27 which can be withdrawn to permit the taking out of the coke after it has become saturated with oxids. At intervals of several days the coke will be reintroduced from the flues through the central opening 5 in the top of the furnace to form the resistor or a part thereof. In this way all or nearly all of the oxids which would otherwise pass out with the gases are saved and returned to the furnace. Coke from other sources, of course, may be used to replenish the resistor as it is consumed.

Figure 6:
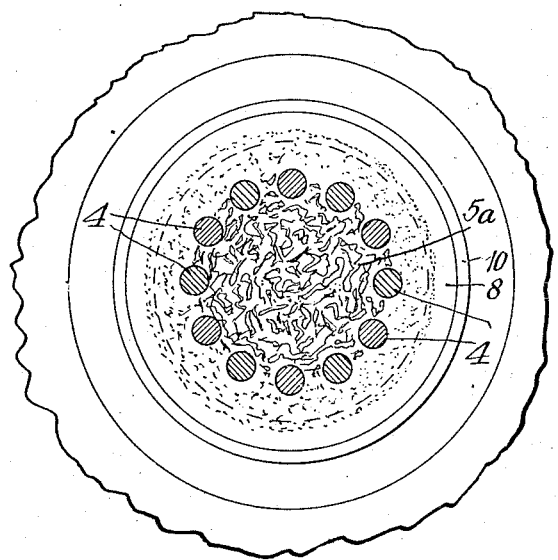

Figs. 6 and 7 show a heating device comprising nine electrodes 4 arranged in a circle so as to form a more clearly defined cage. The coke 5ª is of such size that the major portion will be held within the cage and be built up to a considerable height as shown in Fig. 7, the smaller pieces escaping to some extent and building up around the lower ends of the electrodes. The heat is radiated from the resistor directly to the top of the charge as well as by reflection from the roof. The roof may be cooled by water jackets.

The method thus described yields an extremely pure tin. The losses of the metal are reduced to a minimum. The furnace construction is simple and its operation requires only ordinary skill and knowledge.

Although I prefer the construction of the furnace illustrated, its shape may be changed, as from circular to rectangular. The heating device, comprising the resistor and electrodes, may be located in the center, in a central line along the length of the furnace, or in groups situated at the ends or in various other locations in the furnace. The electrodes may be changed from the vertical positions shown to horizontal or inclined positions. The current may enter all the electrodes from above as shown or may enter from above and leave by one or more electrodes in the bottom. In fact if the resistor well has a carbon bottom, this may serve as one electrode.

The furnace may be used for refining pig tin by inclining the floor on which the tin rests and slowly melting it (as has been done with other furnaces) in order that it shall run off and leave impurities behind. When the furnace is used for smelting other ores, such as zinc ore for example, the procedure is similar to that for tin ore except that, of course, the metallurgy of the process will vary according to the ore being treated. When the furnace is used for melting alloys such as brass, in which it is desired to preserve the low volatile metal such as zinc, the material is placed on the hearth and the process of heating carried out as above. The melting proceeds without oxidation because of the reducing atmosphere and the reducing conditions in general within the furnace. Materials for forming a slag blanket over the molten bath may be used or not according to circumstances.

Therefore, though I have described with great particularity of detail certain specific embodiments of my invention, it will be understood that the invention is not restricted to the particular embodiments disclosed. Various modifications in the design and arrangement of the furnace, in the materials on which it is used and in the steps of the process may be made by those skilled in the art without departing from the invention as defined in the following claims.

What I claim is—

1. A furnace adapted for smelting ores of low volatile metals and for melting such metals comprising an electrical heating device and an annular hearth for the charge located around and outside of said heating device, said furnace being practically closed against the admission of air.

2. A furnace adapted for smelting ores of low volatile metals and for melting such metals having a hearth designed to hold the charge and having an electrical heating device, said furnace being practically closed against admission of air so as to maintain a non-oxidizing atmosphere and non-oxidizing conditions therein, said furnace having outlet flues for the fumes adapted to contain material for trapping the metal in said fumes.

3. A furnace adapted for smelting ores of low volatile metals and for melting such metals having a hearth designed to carry the charge in combination with an electrical resistor out of contact with the metal, said furnace being practically closed against admission of air so as to maintain a non-oxidizing atmosphere and non-oxidizing conditions therein, said furnace having outlet flues for the fumes adapted to contain resistant material for trapping the metal in the fumes so that it can be returned with such resistant material to the resistor in the furnace.

4. A furnace adapted for smelting ores of low volatile metals and for melting such metals having a roof, a central well, a body of resistant material which is solid at operative temperatures in said well and extending above the wall thereof, a surrounding hearth for the charge and electrodes arranged to pass an electric current through said resistant material in said well to heat the same and thereby heat the furnace.

5. A furnace adapted for smelting ores of low volatile metals and for melting such metals having a set of electrodes arranged to form a cage and to receive and carry a body of resistant material adapted to be heated by current from said electrodes.

6. A furnace adapted for smelting ores of low volatile metals and for melting such metals having a roof, a set of electrodes depending through the roof and forming a cage to receive and carry a body of resistant material, the roof having an opening through which the resistant material can be introduced.

7. A furnace adapted for smelting ores of low volatile metals and for melting such metals having a roof, a set of electrodes depending through the roof and forming a cage to receive and carry a body of resistant material and a hearth for the charge surrounding such resistant material.

8. A furnace adapted for smelting ores of low volatile metals and for melting such metals, said furnace being heated by a centrally located electrical heating device.

9. The method of providing heat for smelting ores of low volatile metals and for melting such metals which consists in arranging electrodes in the form of a cage, introducing a body of resistant material into said cage and heating said body by current from said electrodes.

10. The method of smelting ores of low volatile metals and melting such metals which consists in providing an electric heating device and arranging the charge on a hearth surrounding and outside of the same.

11. The method of smelting ores of low volatile metals which consists in heating them in a furnace by means of an electric heating device comprising a resistor, trapping the fumes in a body of resistant material, and using such material as the resistant medium of the resistor.

In witness whereof I have hereunto signed my name.

JAMES H. GRAY.